United States Patent [19]
Zocholl

[11] 3,723,818
[45] Mar. 27, 1973

[54] DIRECT ACTING OVERCURRENT SYSTEM FOR HIGH VOLTAGE CIRCUIT BREAKERS

[75] Inventor: Stanley E. Zocholl, Holland, Pa.

[73] Assignee: I-T-E Imperical Corporation, Philadelphia, Pa.

[22] Filed: Oct. 5, 1971

[21] Appl. No.: 186,672

[52] U.S. Cl..............................317/36 TD, 317/46
[51] Int. Cl................................................H01h 47/18
[58] Field of Search..........................317/36 TD, 46

[56] References Cited

UNITED STATES PATENTS

| | | | |
|---|---|---|---|
| 3,434,011 | 3/1969 | Zocholl | 317/36 TD |
| 3,544,846 | 12/1970 | Thompson | 317/36 TD |
| 3,202,876 | 8/1965 | Mathews et al. | 317/36 TD |
| 3,211,958 | 10/1965 | Miller et al. | 317/36 TD |

Primary Examiner—James D. Trammell
Attorney—Ostrolenk, Faber, Gerb & Soffen

[57] ABSTRACT

A solid state system for high voltage circuit breaker applications utilizing a solid state sensor and time delay circuit adapted to simulate din induction disk type time-current characteristics utilizing standardized components otherwise employed in low voltage breaker applications with adjustable features for tailoring the trip current generated by the solid state circuitry to be compatible with the particular magnetic latch being employed in the high voltage circuit breaker. The magnetic latch is provided with an independent isolated winding controlled by an isolated power source for performing a tripping operation under the control of external and remote control means. Isolation of the sensor and timing circuitry from the control transformers prevents disruptive or damaging transients from being coupled to the solid state sensing circuitry.

3 Claims, 1 Drawing Figure

Patented March 27, 1973
3,723,818
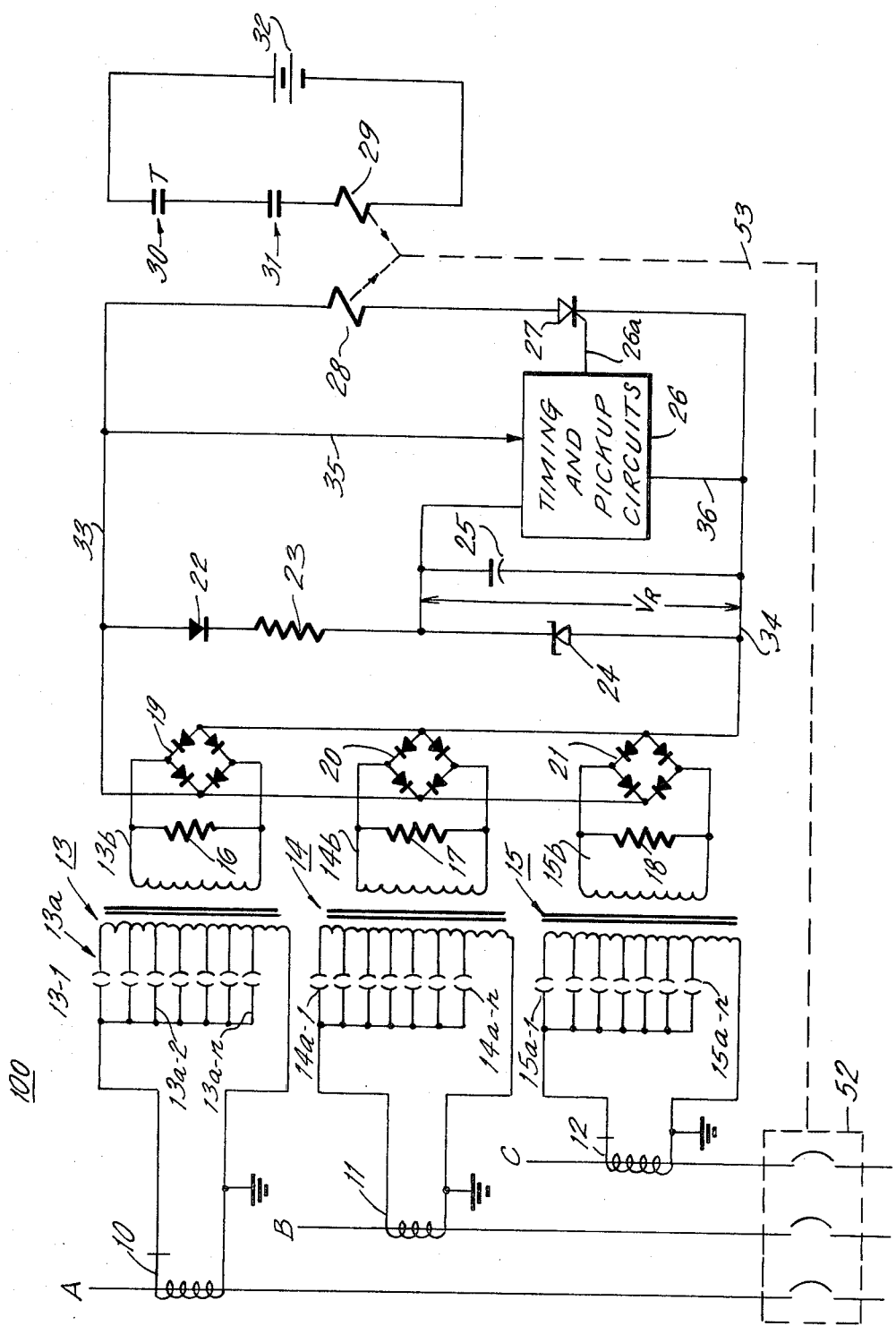
INVENTOR.
STANLEY E. ZOCHOLL
BY
Ostrolenk, Faber, Gerb & Soffen
ATTORNEYS

DIRECT ACTING OVERCURRENT SYSTEM FOR HIGH VOLTAGE CIRCUIT BREAKERS

The present invention relates to protective circuits for power transmission and distribution and more particularly to a novel solid state circuit for use with circuit breakers of high voltage rating with standardized and discretely adjustable components employed to enable the use of the solid state timing and pick-up circuits with circuit breaker magnetic latches having different operating requirements.

BACKGROUND OF THE INVENTION

Solid state direct acting trip device systems have found widespread use in the field of power transmission and distribution networks whose ratings are such as to require low voltage circuit breakers. Such systems normally comprise special ratio current transformers commonly referred to as current sensors; a solid state timing and trip circuit; and a magnetic latch, which is preferably provided with a spring loaded armature which is released when the sensors generate the requisite trip current. The stored energy of the spring provides the tripping force for operating the circuit breaker.

The solid state timing and pick-up circuit is usually provided with a long time delay element and/or a short time delay element as well as an instantaneous element which are each specifically designed for low voltage power system applications. However, direct acting overcurrent sensing systems of the solid state type are not suitable for use in high voltage breaker applications in their present form.

BRIEF DESCRIPTION OF THE INVENTION

Direct acting solid state overcurrent tripping systems constructed for high voltage circuit breaker use must be provided with the following elements and characteristics which are required for high voltage circuit breaker applications;

a. A solid state circuit having induction disk type time-current characteristics provided with an adjustable time dial to change the characteristic time scale over a ratio of one to 15. Devices of this type are disclosed in U.S. Pat. Nos. 3,444,434 issued May 13, 1969; 3,434,011 issued Mar. 18, 1969; and 3,319,127 issued May 9, 1967, all of which patents have been assigned to the assignee of the present invention. Techniques and circuitry are described in the aforementioned U.S. patents in which solid state circuitry is employed to simulate the desired time current characteristics otherwise obtainable only through the use of electromechanical relay devices.

b. An overcurrent trip system input comprising standard five ampere current transformers.

c. A standard tap arrangement including adjustable means for changing the pick-up current of the system over a ratio of one to four in discrete standard tap values.

d. Isolated trip coil terminals provided to permit the circuit breaker to be tripped by external relay contacts and/or controls.

The present invention, which is preferably adapted for use in three-phase systems, is provided with standard five ampere current transformers for sensing current in each of the three phases. An intermediate sensor is provided for each phase and is coupled to its associated standard current transformer and comprises tap means for converting the standard five ampere input to the voltage required by the solid state circuitry and magnetic latch. The intermediate sensors develop the necessary output voltage across burden resistors provided for each phase, which are, in turn, coupled to full wave bridges adapted to convert the output signal to D.C. A circuit is provided for establishing a reference level utilized by a timing and pick-up circuit to control tripping in accordance with the overcurrent level in a given instant, which is compared by the timing circuit against the reference level. The delayed output signal developed by the timing and pick-up circuits is utilized to control a silicon controlled rectifier (SCR), which, when triggered, energizes the trip winding of a magnetic latch, which is powered by the sensing circuit. Adjustment to any one of the discrete tap positions of the intermediate sensor facilitates dovetailing the system to the requirements of the magnetic latch.

The magnetic latch is provided with an isolated winding coupled in a separate circuit powered by an independent power source for tripping the breaker only when closed by a remote relay or other control means. The use of intermediate adjustable sensors in conjunction with the standard transformers provides a wide variety of adjustments to suit the equipment to the particular magnetic latch while at the same time preventing remote control operation of a breaker at reduced current make and break levels.

It is, therefore, one object of the present invention to provide a novel direct acting overcurrent system for high voltage circuit breakers and the like, which incorporates standardized components while providing for rapid adjustment of the system with magnetic latches of varying characteristics.

BRIEF DESCRIPTION OF THE FIGURES

The above, as well as other objects of the present invention will become apparent when reading the accompanying description and drawing, in which:

The sole FIGURE shows a schematic diagram of an overcurrent sensing system designed in accordance with the principals of the present invention.

DETAILED DESCRIPTION OF THE DRAWING

The system of the FIGURE shows a direct acting overcurrent relay arrangement 100 utilizing standard five ampere current transformers 10, 11 and 12 for each of the phases A, B and C of a three-phase power distribution network. Whereas the system to be described herein is equally advantageous for use in single-phase and multi-phase systems, the description given hereinbelow will be directed to a three-phase system.

Each of the current transformers 10, 11 and 12 monitors the currents in their respective phases due to the inductive coupling as shown. The current transformers are each grounded at one terminal as shown and supply current to their intermediate current sensors 13, 14 and 15 respectively, each of which are provided with a tapped primary winding 13a, having adjustably selectable taps 13a-1, 13a-2 and 13a-n through 15a-1, . . . 15a-n. Manually adjustable switch means may be provided for selection of the taps, or alternatively, plug-in inserts may be provided to establish an electrical circuit between each of the nine grounded terminals of current transformer 10–12 and the primary winding circuits 13a–1 through 15a–n, respectively.

The intermediate sensors are respectively provided with secondary windings 13b–15b for developing a voltage across their respective burden resistors 16 – 18. The voltage developed across each of the burden resistors is applied across a first pair of terminals of an associated full-wave diode bridge circuit 19 – 21, respectively. The remaining pairs of terminals of the bridge rectifiers are coupled in parallel to buses 33 and 34, respectively. The full-wave bridge rectifiers operate to provide a D.C. voltage across buses 33 and 34, whose value at any given instant is the largest D.C. level supplied by one of the three bridges 19–21. The D.C. voltage developed across buses 33 and 34 are utilized to energize a reference circuit consisting of zener diode 24, which is connected in series with a diode 22 and current limiting resistor 23. A filter capacitor 25 is coupled in parallel across diode 24 to filter and stabilize the D.C. level. The resulting fixed voltage $V_R$ serves as a reference voltage for pick-up and timing circuit 26, whose necessary bias levels are supplied by the rectified sensor output voltage as represented by leads 35–36.

The timing and pick-up circuit may, for example, be of the type described in the above mentioned U.S. patents. Considering U.S. Pat. No. 3,319,127, for example, and specifically FIG. 2 thereof, a pick-up circuit 12 is provided for preventing the operation of the timing (i.e., delay) circuit until a minimum pick-up level is received, at which time the time delay circuit is energized. The timing circuit is designated by numeral 13 in FIG. 2 of U.S. Pat. No. 3,319,127 and is comprised of a plurality of resistors and capacitors connected in a predetermined manner so as to provide a time-current characteristic which, for example, simulates the time-current characteristics of an induction disk type (electromagnetic) device. After a time delay elapses between pick-up and "timing out," depending upon the magnitude of the overcurrent condition being sensed, the output signal appearing in output terminal 26A is applied to the trigger electrode of SCR 27, turning the SCR ON. Conduction of SCR 27 establishes a current path through the branch circuit comprised of SCR 27 and coil 28 of a circuit breaker magnetic latch. Energization of the magnetic latch coil 28 is derived from the same power utilized to establish the reference voltage and to operate the timing and pick-up circuits 26. Energization of the magnetic latch coil is mechanically coupled to circuit breaker 52 as shown by dotted line 53 to activate the circuit breaker trip circuit and trip open all three phases simultaneously.

The circuit breaker magnetic latch is provided with a second isolated coil 29, which is connected in a single loop circuit comprising a battery source 32, an external trip contact set 30, and a breaker auxiliary contact set 31. Contact set 30, which is normally open, represents any desired external trip contact such as a control switch or an external contact. Contact set 31 forms part of the circuit breaker 52 and is open when the circuit breaker is opened and closed when the circuit breaker is closed (i.e., engaged). Remote control operation which may be provided for any desired purpose is activated by closure of contact set 30. Thus, when the circuit breaker is in the closed condition, contact set 31 is closed establishing a current path through the single loop circuit. The current flows through isolated coil 29, which magnetically engages the spring loaded armature (not shown for purposes of simplicity) which, in turn, is mechanically coupled (see dashed line 53) to the circuit breaker trip mechanism to cause simultaneous opening of the three phases.

The time-current characteristic of the timing and pickup circuitry 26 is preferably provided with an adjustable time dial for changing the characteristic time scale over a ratio of 1:15. A suitable arrangement which may be employed in the timing circuit of the present application is described in U.S. Pat. No. 3,444,434, where a variable resistor is used in series with a capacitor forming a simple series RC timing circuit. An alternate time dial arrangement is shown in U.S. Pat. No. 3,573,555 where a variable duty cycle clamp circuit is used when the timing circuit is more complex.

A salient feature and advantage of the present system resides in the fact that no separate control power is required for overcurrent tripping since the same D.C. level utilized as the sensing voltage is employed to power the timing and pick-up circuit 26 to provide the voltage reference level $V_R$ and to energize the coil 28 of the magnetic latch. In addition, the solid state circuitry is isolated from the control power source through the first and intermediate sensors 10–12 and 13–15 respectively, and bridges 16–18 so as to isolate disruptive and/or damaging transients from the solid state circuitry. The solid state trip circuitry is automatically adjustable to fit the trip current requirements of the magnetic latch and, therefore, need not be individually designed to handle a range of standard high current shunt trip coils, due to the adjustable nature of the intermediate sensors. In addition, the use of an isolated winding 29 for the circuit breaker magnetic latch requires only a small operating current so as to reduce the current make and break requirements for external relaying.

It can be seen from the foregoing description that the direct acting overcurrent trip system described hereinabove provides the use of standard current transformers, standard relay time-over current characteristics with standard four to one pick-up taps and time dial adjustments presently required in high voltage power system applications, while at the same time providing system components which are isolated from the control power transients and surges. The use of saturating intermediate sensors of the type described in U.S. Pat. No. 3,434,011 allows secure operation up to one hundred multiples of pick-up current, thus providing stable and reliable system operation.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A direct acting overcurrent sensing system for operating high voltage circuit breakers and the like comprising:

a first current sensor inductively coupled to a power line being protected;

said first sensor comprising a saturable core adapted to saturate at a point below the upper end of the operating current range of said system;

a second current sensor coupled to the output of said first current sensor, said second sensor having inductively coupled primary and secondary windings;

at least one of said windings having a plurality of taps;

means adjustably coupled to said taps for controlling the output level of the signal developed by said second sensor to be compatible with the operating characteristics of the overcurrent sensing system;

bridge means for converting the output of said second sensor into a D.C. signal;

means coupled to said bridge means for developing a predetermined reference level;

a static time delay circuit;

circuit means coupled to said bridge means and said reference level generating means for enabling said time delay circuit when the output of said bridge means reaches said reference level;

said time delay circuit including means for generating a delayed triggering signal whereby said delay is inversely proportional to the magnitude of the output of said bridge means;

a branch circuit coupled to said bridge means comprising series connected switch means and a trip coil, said switch means having a control input coupled to the output of said time delay circuit for energizing said coil by said bridge means upon the occurrence of said triggering signal;

a circuit breaker coupled to said line being protected, said circuit breaker comprising magnetic latch means for including said trip coil for tripping said circuit breaker when said tripping coil is energized, said second sensor adjustable means being settable to provide the requisite operating power to said magnetic latch.

2. The system of claim 1 wherein said second sensor comprises a saturable core adapted to saturate at a point below the upper end of the operating current range of said system.

3. The system of claim 1 wherein said magnetic latch means is further comprised of a second trip coil;

an independent power source and a first normally-open contact set;

said circuit breaker including a second contact set which closes or opens when the breaker is respectively closed or opened;

said second coil being connected in a series circuit with said second coil, said independent power source and said second contact set;

control means for closing said first contact set when a circuit breaker tripping operation is desired independently of an overcurrent condition by said sensing system, for energizing said second trip coil to trip said breaker when said second contact set is closed.

* * * * *